United States Patent [19]

Skilbeck

[11] Patent Number: 5,380,822
[45] Date of Patent: Jan. 10, 1995

[54] WATER ASSISTED DEVOLATILIZATION

[75] Inventor: John P. Skilbeck, Lunenburg, Mass.

[73] Assignee: Novacor Chemicals (International) S.A., Fribourg, Switzerland

[21] Appl. No.: 68,439

[22] Filed: May 27, 1993

Related U.S. Application Data

[63] Continuation-in-part of Ser. No. 920,244, Jul. 27, 1992, abandoned.

[51] Int. Cl.$^6$ ................................................. C08F 6/10
[52] U.S. Cl. ...................................... 528/499; 528/481; 528/501
[58] Field of Search ........................ 528/481, 499, 501

[56] References Cited

U.S. PATENT DOCUMENTS

| | | | |
|---|---|---|---|
| 3,658,946 | 4/1972 | Bronstert et al. | 260/878 R |
| 3,660,535 | 5/1972 | Finch et al. | 260/880 |
| 3,773,740 | 11/1973 | Szabo | 260/93.5 |
| 3,903,202 | 9/1975 | Carter et al. | 260/880 R |
| 4,195,169 | 3/1980 | Priddy | 528/500 |
| 4,934,433 | 6/1990 | Aboul-Nasr | 159/43.1 |
| 5,069,750 | 12/1991 | Aboul-Nasr | 159/2.001 |
| 5,102,591 | 4/1992 | Hasson et al. | 525/45.9 |
| 5,118,388 | 6/1992 | Aboul-Nasr | 159/2.1 |
| 5,145,728 | 9/1992 | Itaba et al. | 428/213 |

Primary Examiner—Joseph L. Schofer
Assistant Examiner—Tom Weber
Attorney, Agent, or Firm—Bruce E. Harang

[57] ABSTRACT

A polymer melt may be devolatilized to less than 500, preferably less than 150 ppm of residual volatile material by injecting into the melt an amount of water greater than the amount of residual volatile material in the melt, typically not more than about 10 weight % and passing the melt through a flash chamber devolatilizer at a pressure of 8 mm of Hg or less at a temperature of from 200° to 350° C.

14 Claims, 1 Drawing Sheet

WATER ASSISTED DEVOLATILIZATION

This is a continuation-in-part of copending application(s) Ser. No. 07/920,244, filed Jul. 27, 1992, now abandoned.

FIELD OF THE INVENTION

The present invention relates to the devolatilization of melts of one or more polymers. More particularly the present invention relates to devolatilization of polymers of vinyl aromatic monomers or blends of polymers of vinyl aromatic monomers and polyphenylene oxide.

BACKGROUND OF THE INVENTION

U.S. Pat. No. 3,773,740, issued Nov. 20, 1973 in the name of T. T. Szabo, assigned to Union Carbide disclosed the devolatilization of polymers in a flash chamber. Typically the polymers are polymers containing at least one vinyl aromatic monomer. The patent teaches that from 0.50 to 2.75 weight % of water may be injected into a melt of the polymer. The pressure on the polymer melt is suddenly lowered to about 20 to 40 mm of Hg (torr). The water in the polymer melt is flashed to help remove residual vinyl aromatic monomers to about 0.30 weight % or about 3,000 parts per million (ppm).

U.S. Pat. No. 4,195,169, issued Mar. 25, 1980, assigned to The Dow Chemical Company discloses devolatilizing polymers of styrene and acrylic acid or methacrylic acid by contacting the polymer melt with a compound of the formula ROH wherein R may be hydrogen or an alkyl radical. The devolatilization process does not increase the gel content in the resulting polymer (i.e. there are no insolubles in the resulting polymer). The polymers of the present invention are of a different polymeric character in that they do not contain any free carboxylic acid.

Currently, the producers of polymers of vinyl aromatic monomers are seeking to produce polymers or blends of such polymers which contain less than about 200 ppm of monomers, oligomers and solvent.

The Union Carbide patent does not teach one how to reduce monomer, oligomer and solvent levels to those required today. A simple approach might be to merely further reduce the pressure within the devolatilizer. However, at pressures of about 10 torr and less, the water injected into the polymer melt cannot be cooled to sufficiently low temperatures to condense, because it will freeze at such low pressures in the condenser system between the devolatilizer and the vacuum source. Vapour pressure tables of water show at pressures of less than 4.579 mm of Hg water has to be cooled to less than 0° C. to condense. Accordingly, if the pressure in the condenser is less than about 5 mm Hg it is very difficult to keep the system operational.

Operating under very closely controlled procedures and by selecting lots of polymer from a particular batch about the lowest levels of residual monomer, oligomer and solvent that can be obtained are in the range of greater than 175 ppm, typically from 200 to 175 ppm.

Applicants have discovered that one method for overcoming the drawback of the Union Carbide technology is to maintain the pressure within the devolatilizer lower than the pressure within the condenser. One method for achieving this pressure differential is to have a fluid ejector between the devolatilizer and the vacuum source. It is possible to eject a fluid such as steam at this point so as to maintain the very low vacuum required in the devolatilizer yet have a higher pressure in the condenser so that water won't freeze in the condenser.

As a result it is possible to operate a water assisted devolatilizer at pressures below about 10, preferably less than 8, most preferably less than 5 torr and to consistently obtain polymers having levels of monomers, dimers, trimers and solvents of less than 150, preferably less than 100 ppm.

U.S. Pat. No. 5,102,591, issued Apr. 7, 1992 discloses a process to devolatilize a polymer blend of styrene and polyphenylene oxide by passing the blend through an extrusion devolatilizer. That is an extruder equipped with vacuum ports. In such a process the polymer or polymer blend does not descend vertically through a flash chamber. Rather, the melt is passed horizontally in the barrel of an extruder beneath a vacuum port. Additionally, the reference teaches a two stage devolatilization. That is, first the polyphenylene oxide is devolatilized then the polystyrene is added to the polyphenylene oxide and the blend is then devolatilized.

U.S. Pat. No. 5,145,728 discloses reducing the residual monomer and oligomer content of polystyrene by blending with it a block copolymer of styrene and butadiene, typically such as those sold under the trade mark K RESIN. The reference does not contemplate passing the polymer melt through a flash chamber devolatilizer. Rather, the polymer is devolatilized conventionally, then extrusion blended with the block copolymer. In the example at columns 4 and 5, the starting polymer is devolatilized using a screw extruder and water. Interestingly, the residual monomer and solvent level was not reduced below 150 ppm. The present disclosure does not contemplate such a process and does not contemplate a blend comprising block copolymers of a block of one or more $C_{8-12}$ vinyl aromatic monomers which are unsubstituted or substituted by a $C_{1-4}$ alkyl radical and one or more blocks of one or more $C_{4-6}$ conjugated diolefins.

The process of the present invention has an advantage over the extrusion processes as there is a shorter history of shear under high temperature. Each time a polymer blend is passed through an extruder there is some degradation of polymer, particularly a reduction of molecular weight. Furthermore, extrusion processes are relatively expensive.

SUMMARY OF THE INVENTION

The present invention provides a process for reducing the amount of residual monomer, dimer, trimer and solvent to less than 500 parts per million in a polymer or polymer blend containing less than 2 weight % of such residual monomer, dimer, trimer and solvent which process comprises:

(i) heating and maintaining said polymer or polymer blend at a temperature from 200°–270° C.;

(ii) injecting into said polymer or polymer blend an amount of water greater than the amount of residual monomer, dimer, trimer and solvent but less than 10 weight %, said injection being at temperatures of from 200°–270° C. and pressures from 500 to 1500 psi; and iii) passing said polymer or polymer blend through a flash chamber devolatilizer maintained at a temperature from 200°–270° C. and which has a pressure maintained at less than 8 torr.

The present invention further provides a polymer or polymer blend, other than block copolymers, comprising one or more polymers selected from the group consisting of:

(i) from 100 to 30, weight % of one or more monomers selected from the group consisting of: $C_{8-12}$ vinyl aromatic monomers which are unsubstituted or substituted by a $C_{1-4}$ alkyl radical; and (ii) from 0 to 70, weight % of one more monomers selected from the group consisting of: $C_{1-4}$ alkyl esters of acrylic or methacrylic acid; and acrylonitrile and methacrylonitrile;

which polymers may be grafted on to from 0 to 40 weight % of one or more rubbery polymers selected from the group consisting of:

(iii) one or more $C_{4-6}$ conjugated diolefin monomers; and (iv) polymers comprising from 20 to 80 weight % of one or more $C_{8-12}$ vinyl aromatic monomers and from 80 to 20 weight % of one or more $C_{4-6}$ conjugated diolefins, containing typically less than 150, more typically less than 125, most typically less than 100, preferably less than 75, most preferably less than 50 parts per million of organic compounds selected from the group consisting of monomers, dimers, trimers, and solvent.

The present invention also provides a cooperating devolatilizer, condenser and vacuum source in series wherein a gas ejector is located between said devolatilizer and said condenser, said gas ejector being of a size and cooperating with said condenser and said vacuum source to permit said devolatilizer to be operated at pressures of less than 10, preferably less than 8 mm Hg and said condenser to be operated at pressures greater than 8, preferably greater than 10 mm Hg.

DETAILED DESCRIPTION

Figure 1:
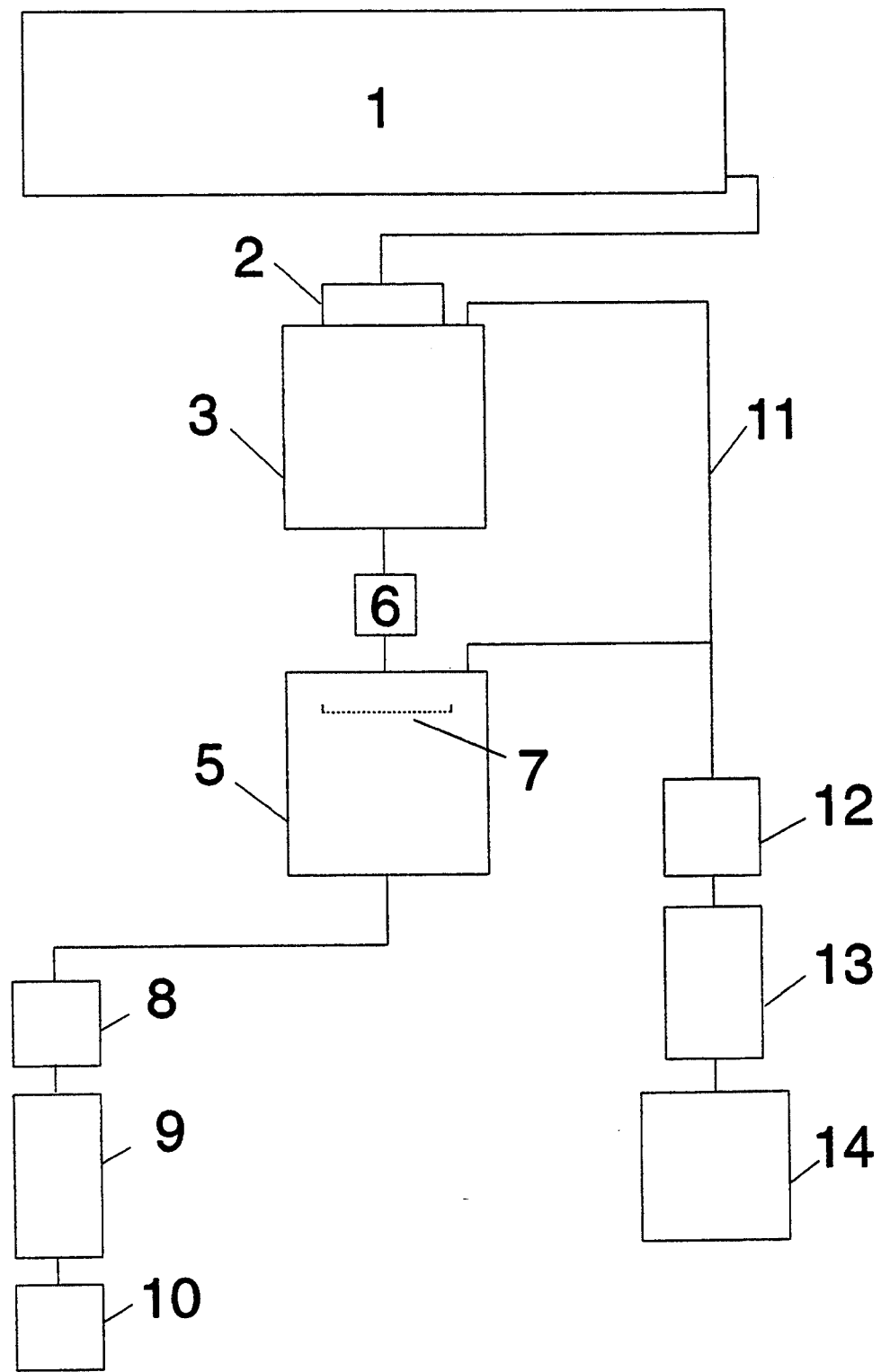
FIG. 1 is a schematic diagram of the cooperating arrangement of devolatilizer, gas ejector, condenser and vacuum source which may be used in accordance with the present invention.

One embodiment of the present invention will now be briefly described in conjunction with the drawing.

In the bulk or solution polymerization of a number of monomers containing one or more vinyl aromatic monomers, the monomers are fed to one or more reactors where they are polymerized to at least about 65% conversion. The polymer leaves the reactor, in the case of a tower process as illustrated by U.S. Pat. No. 3,658,946, issued Apr. 25, 1972, assigned to BASF and U.S. Pat. No. 3,660,535, issued May 2, 1972, assigned to the Dow Chemical Company, or the last reactor 1, in the case of a Monsanto type process as illustrated by U.S. Pat. No. 3,903,202, issued Sep. 2, 1975, assigned to Monsanto, and travels through a preheater 2. The preheater heats the polymer melt to a temperature of from about 200° to 270° C. to increase the vapour pressure of the volatiles and reduce the viscosity of the melt to permit it to foam. An additional problem which must be considered is the cooling of the polymer melt due to the latent heat of vaporization of the volatiles as the melt travels through the devolatilizer.

The heated polymer melt passes into the first stage 3 of a two-stage falling strand devolatilizer. The devolatilizer is operated at temperatures from 200 to 350, preferably from 210 to 255, most preferably from 225° to 235° C. Typically the pressure in the first stage of the devolatilizer will be from 10 to 45, preferably less than 20 mm Hg. The polymer melt descends from the preheater and is deposited on the bottom of the vessel. As the polymer melt descends through the devolatilizer, volatiles within the melt are flashed off. The polymer melt at the bottom of the first stage 3 of the two-stage reactor should have a residual content of monomer, dimers, trimers and solvent of less than 2, preferably less than 1, most preferably less than 0.5 weight %.

The melt is then collected and pumped to the second stage 5 of the two-stage devolatilizer. Between the first and second stage of the two-stage devolatilizer is a water injector unit 6. As noted above, the figure is a schematic diagram. The devolatilizer could comprise more than two stages.

Water injector 6, is operated at temperatures from 200° to 275° C., preferably at temperatures approximate those in the devolatilizer, and at pressures from 500 to 1500 psi. The water injector is operated to provide typically less than 10, more typically less than 5, most typically less than 2, preferably less than 1, most preferably from 0.45 to 0.74, most desirably from 0.05 to 0.60 weight % of water into the polymer melt. Generally, for the injection of water to be useful in the reduction of volatile material in a polymer melt, the amount of water injected into the melt should be greater than the amount of residual volatile materials in the melt. From a practical point of view, the amount of water injected into the melt should be in accordance with the above teaching.

Preferably the water injector contains a mixing means such as a static mixer.

The mixture of polymer melt and water then pass through the second stage 5 of the devolatilizer. The devolatilizer is operated at temperatures from 200° to 270°, preferably from 210° to 255°, most preferably from 225° to 235° C. The second stage 5 of the devolatilizer should be operated so that the polymer melt is exposed to a pressure of less than 8, preferably less than 5, most preferably less than 3 mm Hg.

To increase the residence time of the polymer melt in the second stage 5 of the devolatilizer, a distributor tray 7 may be inside the devolatilizer. However, as noted above, a distributor tray is preferred, but not essential, in accordance with the present invention.

To provide suitable appropriate residence times within the stages of the devolatilizer, a distributor tray 7 may be inside the devolatilizer. Various distributor designs have been described in U.S. Pat. No. 4,934,433, issued Jun. 19, 1990, U.S. Pat. No. 5,069,750, issued Dec. 3, 1991, and U.S. patent application Ser. No. 507,740, filed Apr. 12, 1990, now U.S. Pat. No. 3,118,388 all assigned to Polysar Financial Services S.A. now renamed Novacor Chemicals (International) S.A.

As the polymer descends through the last stage 5 of the falling strand devolatilizer typically in the form of a strand, it is deposited and usually held on the distributor tray in the form of a foam. The water in the polymer and residual monomer. dimers, trimers, and solvent are flashed off. The polymer melt then descends to the bottom of the second stage 5 of the devolatilizer, or more generally, of the last stage of the devolatilizer, as the case may be. The melt is then pumped to a strand forming die 8, and the strands typically pass through a cooling water bath 9 into a pelletizer 10.

The water vapour and volatile monomer(s), dimers, trimers, solvent(s) and any non-condensable gases are withdrawn overhead from the devolatilizer. In the figure, for the sake of convenience, only one common line 11 is shown. From a practical point of view, there may be several lines. It is most important that in the vapour line coming from the devolatilizer being operated at pressures of less than 8 mm Hg and the condenser 13, and between the devolatilizer and the condenser, there be a gas ejector 12, preferably useful with steam or other inert gases. The rate of gas ejection should be such that the pressure in the last stage of the devolatilizer can be maintained below 8 mm Hg and the pressure in the condenser can be maintained to permit the condensation of water without freezing.

Downstream of the condenser is a vacuum source 14, which should be of sufficient size so as to be capable of maintaining the vacuum throughout the devolatilizer and condenser system.

Typically the polymer melt is a melt of one or more polymers selected from the group of polymers including polystyrene, high impact polystyrene (HIPS), styrene acrylonitrile polymers (SAN), acrylonitrile butadiene styrene polymers (ABS), styrene methyl methacrylate polymers, and butadiene styrene methyl methacrylate polymers (MBS), and one or more of the aforesaid polymers, most preferably high impact polystyrene blended with polyphenylene oxide.

Generally, the polymers which may be treated in accordance with the present invention comprise:
(i) from 100 to 30, preferably from 100 to 50, most preferably from 100 to 70 weight % of one or more monomers selected from the group consisting of: $C_{8-12}$ vinyl aromatic monomers which are unsubstituted or substituted by a $C_{1-4}$ alkyl radical; and
(ii) from 0 to 70, preferably 0 to 50, most preferably from 0 to 30 weight % of one more monomers selected from the group consisting of: $C_{1-4}$ alkyl esters of acrylic or methacrylic acid; acrylonitrile and methacrylonitrile;
which polymers may be grafted on to from 0 to 40, preferably from 0 to 20, weight % of one or more rubbery polymers selected from the group consisting of: one or more $C_{4-6}$ conjugated diolefin monomers and polymers comprising from 20 to 80, preferably from 40 to 60, weight % of one or more $C_{8-12}$ vinyl aromatic monomers and from 80 to 20, preferably from 60 to 40 weight % of one or more $C_{4-6}$ conjugated diolefins.

Suitable vinyl aromatic monomers include styrene, α-methyl styrene, and p-methyl styrene. Suitable esters of acrylic or methacrylic acid include methyl methacrylate, ethyl methacrylate, methyl acrylate, ethyl acrylate, and butyl acrylate. Suitable conjugated diolefin monomers include butadiene and isoprene. Most preferably the polymer melt is polystyrene or high impact polystyrene (HIPS).

The present invention has been described in terms of the devolatilization of a polymer melt of polystyrene. However, the present invention may also be used in association with melts of other polymers such as acrylonitrile butadiene styrene polymers (ABS), styrene acrylonitrile polymers (SAN), and polymer blends. The present invention is particularly useful where polymers are solution blended. That is, miscible solutions of two polymers are mixed and the solvent(s) is/are removed. In such cases, it is often desirable to remove the solvent(s) to as low a level as possible.

One commercially available blend in which the present invention may be useful is a blend of polyphenylene oxide (trademark) and polystyrene or a blend of polyphenylene oxide and high impact polystyrene. Typically, the weight ratio of polystyrene to polyphenylene oxide is from 90:10 to 10:90, preferably from 70:30 to 10:90.

Other applications of the present invention will be apparent to those skilled in the art.

The present invention will now be illustrated by the following examples in which, unless otherwise specified, parts is parts by weight (i.e. grams) and % is weight %.

SAMPLE PREPARATION

Samples of commercially available crystal polystyrene pellets were mixed with various amounts of a specially prepared rubber modified polystyrene which contained about 1.2 weight % residual styrene monomer. The mixture of pellets was passed through an extruder to achieve a homogeneous melt blend. The extruder provided motive pressure to pass the melt blend through a static mixing device. Between the extruder and the mixing device, various amounts of water were injected into the melt. The melt was pumped into the devolatilizer onto a distributor. The polymer coming out of the devolatilizer was analyzed for residual monomer. The conditions and results of the experiments are set forth in Table 1.

TABLE 1

| Vacuum (mm/Hg) | Water Rate (Weight/Percent) | Melt Temperature °F. | Residual Styrene (PPM) | Total Residual Volatiles (PPM) |
|---|---|---|---|---|
| Atmospheric | 0.0 | 475 | 1130 | 1240 |
| 2.0 | 0.0 | 466 | 290 | 310 |
| 2.0 | 1.0 | 463 | 80 | 80 |
| 1.0 | 1.0 | 475 | 70 | 70 |
| 1.0 | 1.0 | 473 | 40 | 44 |
| 2.0 | 1.0 | 447 | 110 | 110 |
| 2.0 | 1.0 | 443 | 100 | 110 |

These results show that residual monomer and volatiles may be consistently reduced to less than 150 ppm using the present invention.

EXAMPLE 2

Four further runs were carried out in the same manner as Example 1. The conditions and the results of the runs are set forth in Table 2.

TABLE 2

| Run | Vacuum (Torr) | Water Rate (Weight/Percent) | Melt Temperature °F. | Residual Styrene (PPM) | Total Residual Monomers (PPM) |
|---|---|---|---|---|---|
| 1 | 1.0 | 1.7 | 450 | 100 | 110 |
| 2 | 6.5 | 1.7 | 457 | 120 | 130 |
| 3 | 11.0 | 1.6 | 452 | 170 | 190 |
| 4 | 13.0 | 1.7 | 455 | 210 | 230 |

The experiments show that at higher levels of vacuum better results are obtained. If the devolatilization can be carried out at pressures below about 8 torr, excellent results can be obtained. However, when operating at these pressures, during condensation, care should be taken to avoid freezing the water injected into the melt.

What is claimed is:
1. In a process for reducing the amount of residual monomer and solvent to less than 500 ppm in:
(A) a polymer comprising:
(i) from 100 to 30 weight % of one or more monomers selected from the group consisting of $C_{8-12}$ vinyl aromatic monomers which are unsubstituted or substituted by a $C_{1-4}$ alkyl radical; and (ii) from 0 to 70 weight % of one or more monomers selected from the group consisting of $C_{1-4}$ alkyl esters of acrylic or methacrylic acid, acrylonitrile and methacrylonitrile;

which polymers may be grafted on to from 0 to 40 weigh % of one or more rubbery polymers selected from the group consisting of:

(iii) polymers consisting essentially of one or more $C_{4-6}$ conjugated diolefin monomers; and (iv) polymers consisting essentially of from 20 to 80 weight of one or more $C_{8-12}$ vinyl aromatic monomers and from 80 to 20 weight % of one or more $C_{4-6}$ conjugated diolefins; or (B) a blend of said polymer and polyphenylene oxide;

which polymer or polymer blend contains less than 1 weight % of residual monomer, dimer, trimer and solvents, which process comprises:

(i) heating and maintaining said polymer or polymer blend at a temperature from 200° to 270° C.;

(ii) injecting into said polymer or polymer blend an amount of water greater than the amount of residual monomer, dimer, trimer, and solvent but less than 1 weight %, said injection being at temperatures from 200° to 270° C. and pressures from 500 to 1500 psi;

(iii) passing said polymer or polymer blend through a flash chamber devolatilizer maintained at a temperature from 200° to 270° C. and a pressure of less than 5 torr to flash off a vapour phase comprising water, monomer, and solvent;

(iv) withdrawing said vapour phase from said flash chamber devolatilizer and passing it to a condenser maintained at a reduced pressure greater than 5 torr by ejecting a gas inert to said vapour phase into said vapour phase intermediate said flash chamber and said condenser; and (v) condensing at least the water in said vapour phase.

2. The process according to claim 1, wherein said polymer or polymer blend is maintained at a temperature from 225° to 235° C.

3. The process according to claim 2, wherein the pressure within said flash chamber is maintained below 3 torr.

4. The process according to claim 3, wherein said gas inert to said vapour phase is selected from the group consisting of steam and inert gases.

5. The process according to claim 4, further comprising depositing said polymer or polymer blend on a distributor tray within said flash chamber.

6. The process according to claim 4, wherein said polymer is polystyrene.

7. The process according to claim 5, wherein said polymer is polystyrene.

8. The process according to claim 4, wherein said polymer blend is a blend of polystyrene and polyphenylene oxide.

9. The process according to claim 5, wherein said polymer blend is a blend of polystyrene and polyphenylene oxide.

10. The process according to claim 5, wherein the amount of residual monomer and solvent is reduced to less than 150 ppm.

11. The process according to claim 6, wherein the amount of residual monomer and solvent is reduced to less than 150 ppm.

12. The process according to claim 7, wherein the amount of residual monomer and solvent is reduced to less than 150 ppm.

13. The process according to claim 8, wherein the amount of residual monomer and solvent is reduced to less than 150 ppm.

14. The process according to claim 9, wherein the amount of residual monomer and solvent is reduced to less than 150 ppm.

* * * * *